United States Patent Office 2,807,927
Patented Oct. 1, 1957

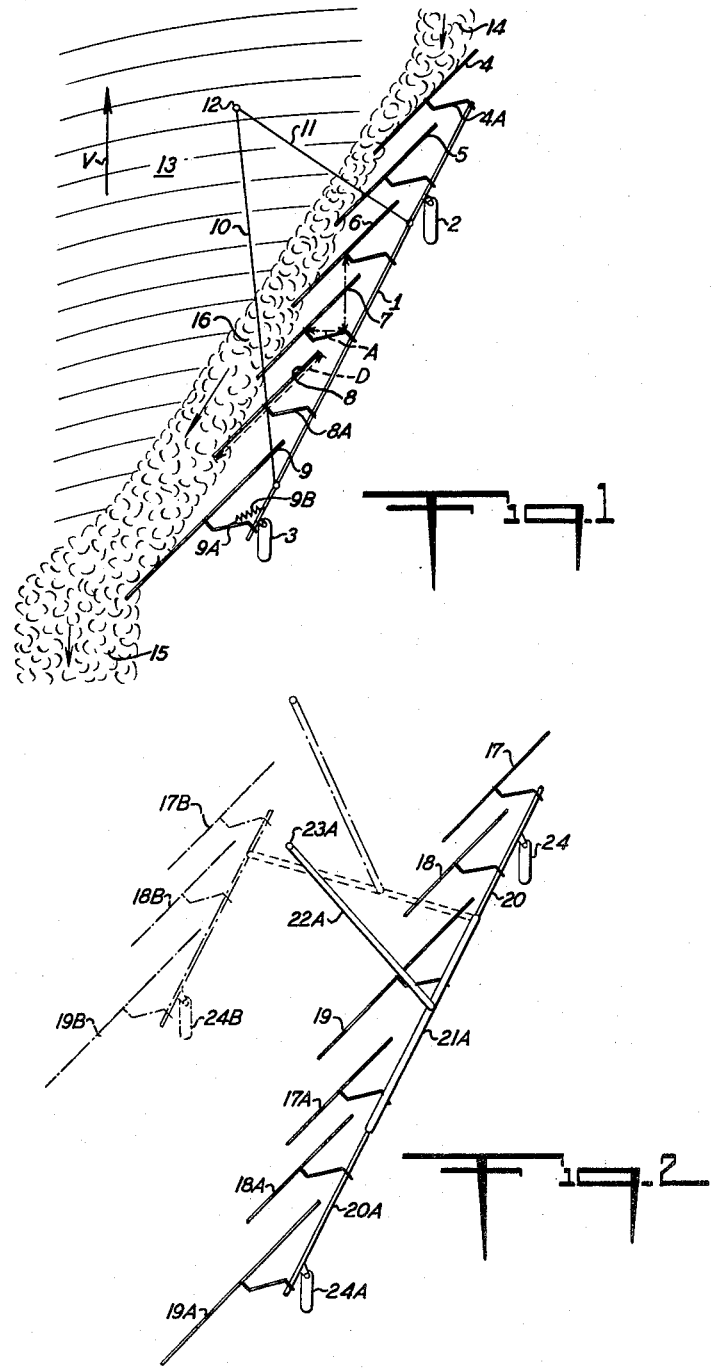

2,807,927

SIDE DELIVERY RAKE WITH DIFFERENT DIAMETER RAKING WHEELS

Cornelis van der Lely and Ary van der Lely, Maasland, Netherlands, assignors to C. van der Lely N. V., Maasland, Netherlands, a Dutch limited company Application May 3, 1954, Serial No. 427,155

Claims priority, application Netherlands May 9, 1953

8 Claims. (Cl. 56—377)

This invention relates to devices for displacing material lying on the ground, and more particularly to devices comprising at least two raking members, such as rake wheels or drums, which overlap each other and are put into rotation by contact with the ground and/or the material lying thereupon.

Known devices of this kind known up till now are provided with rake wheels having large diameters such as, for example, 4 feet and greater. The use has even been proposed of heavy and expensive rake wheels having diameters of 5.3 feet with which material gathered to a large height of approximately 3.3 feet, for example, can be worked without difficulty.

The present invention is based upon the principle that material accumulated to large heights can be worked with relatively small rake wheels and that the use of small rake wheels is attended by important advantages.

The invention will be hereinafter explained in greater detail with reference to the accompanying drawings in which preferred embodiments of the raking device according to the invention have been diagrammatically illustrated by way of example and in which:

Fig. 1 is a plan view of a side delivery rake according to the invention,

Fig. 2 shows in plan view a device according to the invention which may be used as a side delivery rake and as a swath turner.

The side delivery rake shown in Fig. 1 comprises a frame which is formed by a beam 1 supported by running wheels 2 and 3 and carrying six rake wheels 4, 5, 6, 7, 8 and 9, said beam 1 being connected to a draw point 12 by means of bows 10 and 11 extending over and across the rake wheels. The running wheel 2 is a caster wheel, consequently it is freely rotatable about the vertical axle which supports it on the beam 1, whereas the running wheel 3 has a fixed position. The device can be moved forward by connecting the point 12 to a tractor. The rake wheels 4—9 are mounted for rotation on the crank pins of cranks 4A—9A which are journaled in the beam 1, so that the rake wheels are movable in vertical sense in relation to the frame and are adapted to follow individually the unevennesses of terrain. This is a conventional mounting as is shown in the Crowe Patent No. 2,602,280 of July 8, 1952. The rake wheel 9 includes a rim from which rim a multiplicity of teeth extend in equally spaced relation. The other rake wheels 4—8, though smaller, have the same circumferential construction as the rake wheel 9. This structure is conventional and can be found in British Patent No. 680,537 granted to Van Der Lely and published on October 8, 1952. The outer diameter D of the rake wheels 4—8 are equal to each other and amount to about 2.7 feet, whereas the outer diameter of the rake wheel 9 is larger and amounts to about 4 feet. By a spring 9B the upper end of a cam fixed to the crank 9A is connected to the projection of the beam 1, by which the pressure of the wheel 9 upon the ground is reduced and becomes inferior to the weight of said wheel. The rake wheels 4—8 are, however, not provided with a device of this kind for reducing wheel pressure.

In Fig. 1 the distance between the hubs of two consecutive rake wheels, such as the distance between the rake wheels 6 and 7, measured in a direction at right angles to the travelling direction V of the device, has been indicated by A. The axes of the rake wheels form an angle of about 45° with the travelling direction V. In the illustrated device the distance A is about 1 foot, i. e. said distance is considerably larger than one seventh part of the sum of the diameters of the two consecutive rake wheels. By the diameter of a rake wheel is meant the outer diameter, such as the diameter D of the rake wheel 8 in Fig. 1.

The working of this device is based on the fact that the gathered material, at least at the rake wheels 4—8, performs a rolling motion, in consequence of which the material lifted up by the rake wheels presses against said wheels only to a height of about 1 foot, but remains at some distance from the wheel at a higher elevation. In principle it is, therefore, possible to make the rake wheels of a conventional side delivery rake one half their normal height; however, in order that the wheels sufficiently overlap one another and are adapted to cover collectively the same working width, the number of rake wheels should be increased. If the diameter of the rake wheels is halved and the number thereof is doubled (which is actually unnecessary), an important saving of weight and cost of rake wheels will be obtained, since each wheel only requires about one fourth of the material needed for a wheel of double dimensions. Thus, in total there will be a saving of at least half the amount of required material, which is important because of the expensive spring steel used for the spokes and the teeth of the wheels.

Moreover, each of the small wheels will have such a small weight that it will be possible to let the wheels rest with their full weight on the ground. Thus, devices, such as springs, for reducing wheel pressure on the ground may be omitted. In addition to a saving in costs, the invention presents the advantage that in the most simple manner a wheel pressure is realized which is wholly independent of the position of the wheel. Moreover, the bows 10 and 11, which extend in arch-like fashion over the wheels 5—9, have to extend upwardly less than in a device equipped with larger rake wheels. As a consequence there will be much smaller bending moments in said bows and they can be made, therefore, lighter in weight.

Small rake wheels according to the invention present the advantage that they are able to adapt themselves more readily to rough terrain and are more suitable for removing material from depressed areas, such as ditches and the like.

If the diameters of a series of rake wheels and the distances therebetween are halved, the free space between two overlapping rake wheels and the ground, viewed in a direction at right angles to the wheel plane, will be halved as well. In principle, the reduction of this space is not necessary, and consequently it will be unnecessary, when halving the diameters of the rake wheels, to halve also the distances between the axes of the rake wheels. It follows that the number of rake wheels need not be doubled, but need only be increased by a factor of from 1.5–1.7. This means a further considerable saving in costs and weight. Whereas in known raking devices, the distance A should be considerably smaller than two sevenths of the dimension D, a much larger proportion may be adopted with the small rake wheels according to the invention. If the diameters of two overlapping rake wheels are not fully equal, the distance A for said wheels may be made larger than one seventh of the sum of the diameters of said wheels.

In use, the device according to Fig. 1 operates in such a manner that the material 13 lying on the ground and/or the material that has already been raked together according to an oblong heap 14 will be delivered to the left in the shape of an oblong heap 15. The material 16 that is located just in front of the rake wheels extends in oblique direction. The material 15 adjoins thereto at an angle. Since the rake wheel 9 is located just at the region of this transition, the wheel 9 operates under somewhat different conditions than the rake wheels 4—8. The material delivered by the rake wheel 9 is not engaged by a further wheel, so that the material tends to press against said wheel at higher elevations. As a consequence it might be possible that the material would be forced by the upper half of the wheel 9 forward again, and, accordingly, the wheel would be jammed. In order to avoid this result, the wheel 9 is made of larger dimensions than the wheels 4—8.

The device according to Fig. 2 comprises two groups of rake wheels, viz. three rake wheels 17, 18 and 19 mounted on cranks journaled in a beam 20, and three rake wheels 17A, 18A and 19A mounted on cranks journaled in a beam 20A. This structure is conventional and can be found in Crowe Patent No. 2,602,280 cited above. The beams 20 and 20A are connected together by a U-shaped bow 21A of which the downwardly extending limbs are connected to the beams 20 and 20A so as to be rotatable on vertical axes. The bow 21A is provided with a draw arm 22A of which the end 23A may be attached to a tractor. The beams 20 and 20A are respectively supported by a running wheel 24 and 24A. In the position shown in full lines the device acts as a side delivery rake. This rake can be transformed into a swath turner by placing the parts of the device indicated additionally by the letter A in the position shown in dotted lines, wherein the parts 17A—24A have been indicated by 17B—24B. The rake wheels 17, 18, 17A and 18A are small rake wheels, but the rake wheels 19 and 19A are of greater dimensions, since the rake wheel 19A always constitutes the rearmost of a series of overlapping rake wheels, and the rake wheel 19 is the rearmost of a series of overlapping rake wheels when the device acts as a swath turner. Since in this position the wheel 19 has only to discharge material over the width of one swath, it is, however, also possible to make this rake wheel of small dimensions.

There will now be obvious to those skilled in the art many modifications and variations utilizing the principles set forth and realizing many or all of the objects and advantages of the apparatus described but which do not depart essentially from the spirit of the invention.

What we claim is:

1. A device for laterally displacing material lying on the ground comprising at least two circular raking members overlapping each other and rotated by contact with the ground, and an additional larger diameter raking member trailing said first mentioned members in overlapping relationship with the next adjacent of said first mentioned members, the space between the two last mentioned members being greater than that between the two first mentioned members.

2. A device for laterally displacing material lying on the ground, comprising at least two circular raking members overlapping each other and rotated by contact with the ground and an additional raking member which is larger in diameter than at least one of said first mentioned raking members and trailing said first mentioned members in overlapping relationship.

3. A device as defined in claim 2 wherein the raking members in at least one working position of the device are divided into at least two groups of raking members overlapping each other, the rearmost raking member of each group having a larger diameter than the other raking members of its group.

4. A device as claimed in claim 2 comprising a frame supporting said members and arching over the raking members having the smallest diameters.

5. A device as claimed in claim 2 comprising counterbalancing means fixed on the raking member having the largest diameter.

6. A raking device comprising a frame, rollers attached to said frame for permitting movement of said frame and at least one group of free-wheeling raking wheels each rotatably coupled to said frame, the rearmost raking wheel of said group of free-wheeling raking wheels having a larger diameter than the remainder of said free-wheeling raking wheels the spacing between the rearmost raking wheel and the next adjacent raking wheel being greater than the spacing between the remaining adjacent raking wheels.

7. A raking device as claimed in claim 6 comprising counterbalancing means affixed only to said rearmost raking wheel.

8. A device for laterally displacing material lying on the ground comprising at least two circular raking members overlapping each other and rotated by contact with the ground, the rearmost of said raking members having a substantially larger diameter than the other of said raking members.

References Cited in the file of this patent

UNITED STATES PATENTS

| | | |
|---|---|---|
| 2,447,354 | Morrill | Aug. 17, 1948 |
| 2,472,260 | Morrill | June 7, 1949 |
| 2,635,411 | Hicks | Apr. 21, 1953 |
| 2,680,343 | Enos | June 8, 1954 |